United States Patent
Farrow et al.

Patent Number: 5,738,258
Date of Patent: Apr. 14, 1998

[54] MULTI-SPORT ROOF RACK SYSTEM

[75] Inventors: Paul H. Farrow, Concord, Mass.; Dale W. Vetter, Nashua, N.H.

[73] Assignee: Walden Products, Inc., Concord, Mass.

[21] Appl. No.: 734,884

[22] Filed: Oct. 22, 1996

Related U.S. Application Data

[60] Provisional application No. 60/013,811, Mar. 21, 1996.

[51] Int. Cl.⁶ .................. B60R 9/10; B60R 9/08
[52] U.S. Cl. .......... 224/324; 224/319; 224/329; 224/325; 224/309; 224/924
[58] Field of Search .................. 224/309, 319, 224/320, 321, 322, 323, 324, 325, 326, 329, 330, 331, 924, 917.5; D3/261

[56] References Cited

U.S. PATENT DOCUMENTS

| | | | |
|---|---|---|---|
| D. 340,020 | 10/1993 | Yamamoto | D3/261 |
| 2,235,012 | 3/1941 | Colvin | 224/329 |
| 3,001,679 | 9/1961 | Canning et al. | |
| 3,826,390 | 7/1974 | Watson | 214/450 |
| 3,848,784 | 11/1974 | Shimono et al. | 224/323 |
| 4,084,735 | 4/1978 | Kappas | 224/917.5 |
| 4,442,961 | 4/1984 | Bott | 224/924 |
| 4,640,450 | 2/1987 | Gallion et al. | 224/331 |
| 4,720,031 | 1/1988 | Zimmerman | 224/917.5 |
| 4,817,838 | 4/1989 | Kamaya | 224/323 |
| 5,054,673 | 10/1991 | Dixon | 224/323 |
| 5,115,955 | 5/1992 | Dallaire et al. | 224/917.5 |
| 5,137,195 | 8/1992 | Walter | 224/315 |
| 5,288,003 | 2/1994 | MacDonald | 224/328 |
| 5,350,097 | 9/1994 | Walter | 224/917.5 |
| 5,516,017 | 5/1996 | Arvidsson | 224/310 |
| 5,524,803 | 6/1996 | Arvidsson | 224/321 |

FOREIGN PATENT DOCUMENTS

| | | | |
|---|---|---|---|
| 433495 | 6/1991 | European Pat. Off. | 224/322 |
| 406107077 | 4/1994 | Japan | 224/319 |

*Primary Examiner*—Henry J. Recla
*Assistant Examiner*—Gregory M. Vidovich
*Attorney, Agent, or Firm*—Hamilton, Brook, Smith & Reynolds, P.C.

[57] ABSTRACT

A single roof rack system accommodates several outdoor sports equipment items simultaneously and provides expandable sizing to fit a variety of motor vehicles without requiring equipment-specific add-on mounting supports. The system includes shaped carrying pods which have built-in mounting surfaces and tie-downs for accommodating sports equipment items such as kayaks, canoes, bicycles, skis, snowboards, sailboards, and surfboards.

32 Claims, 7 Drawing Sheets

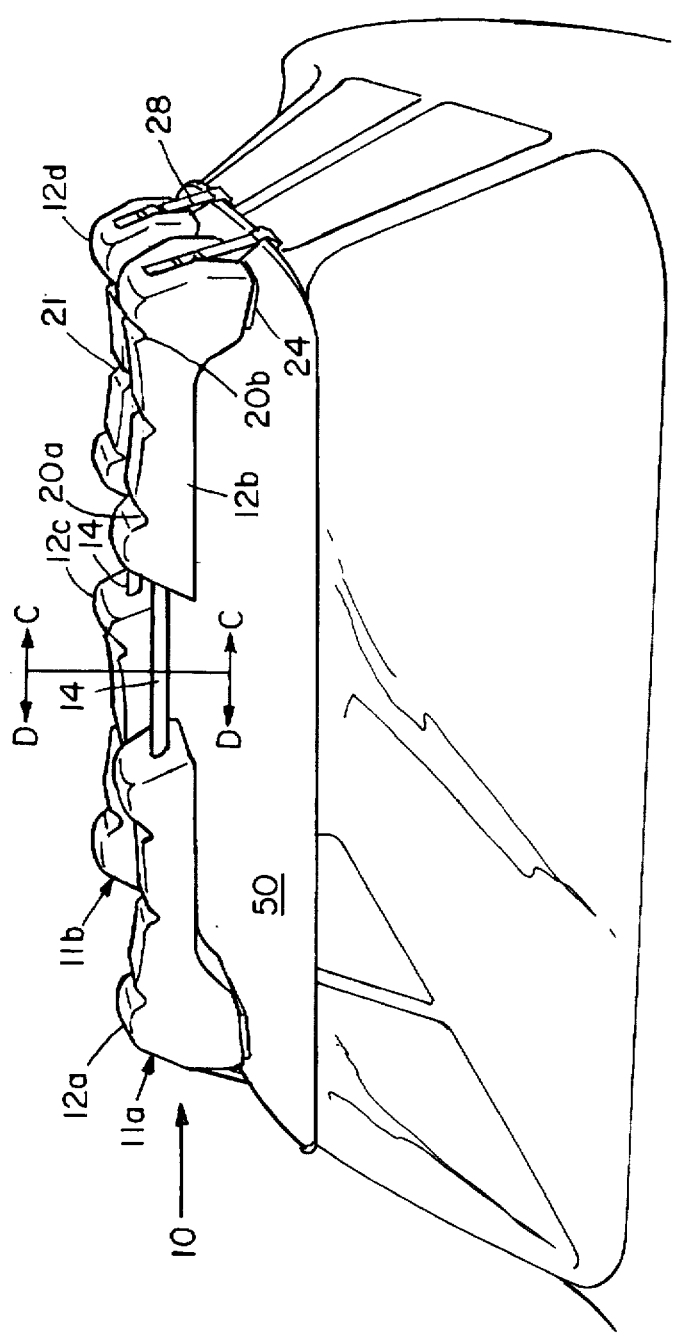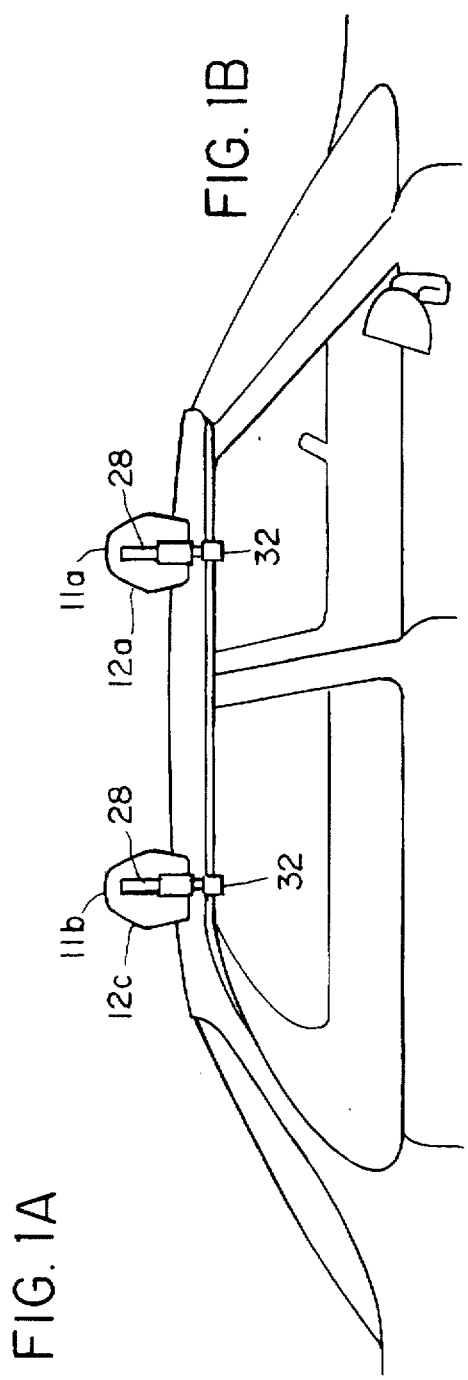
FIG. 1A
FIG. 1B

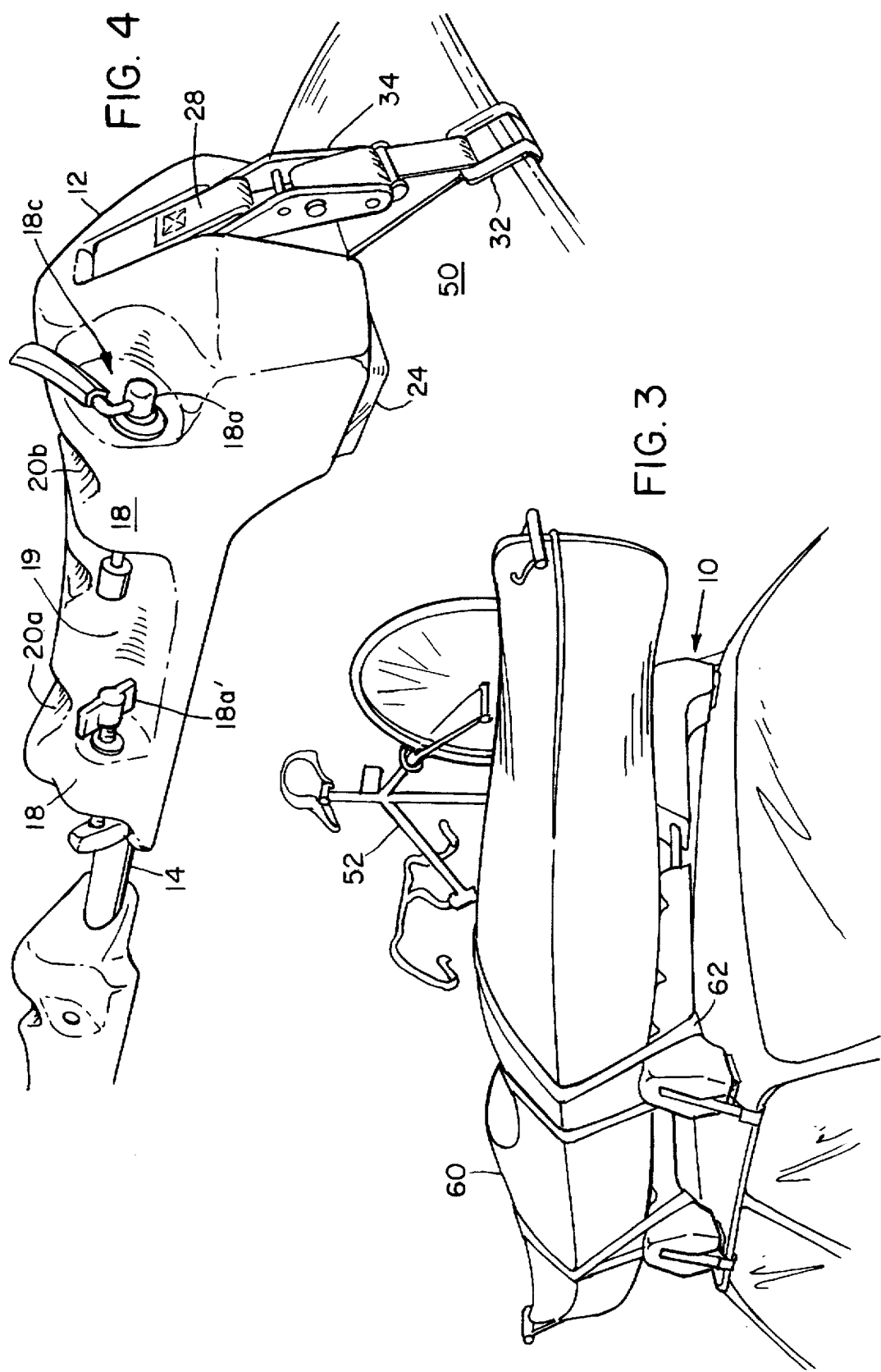

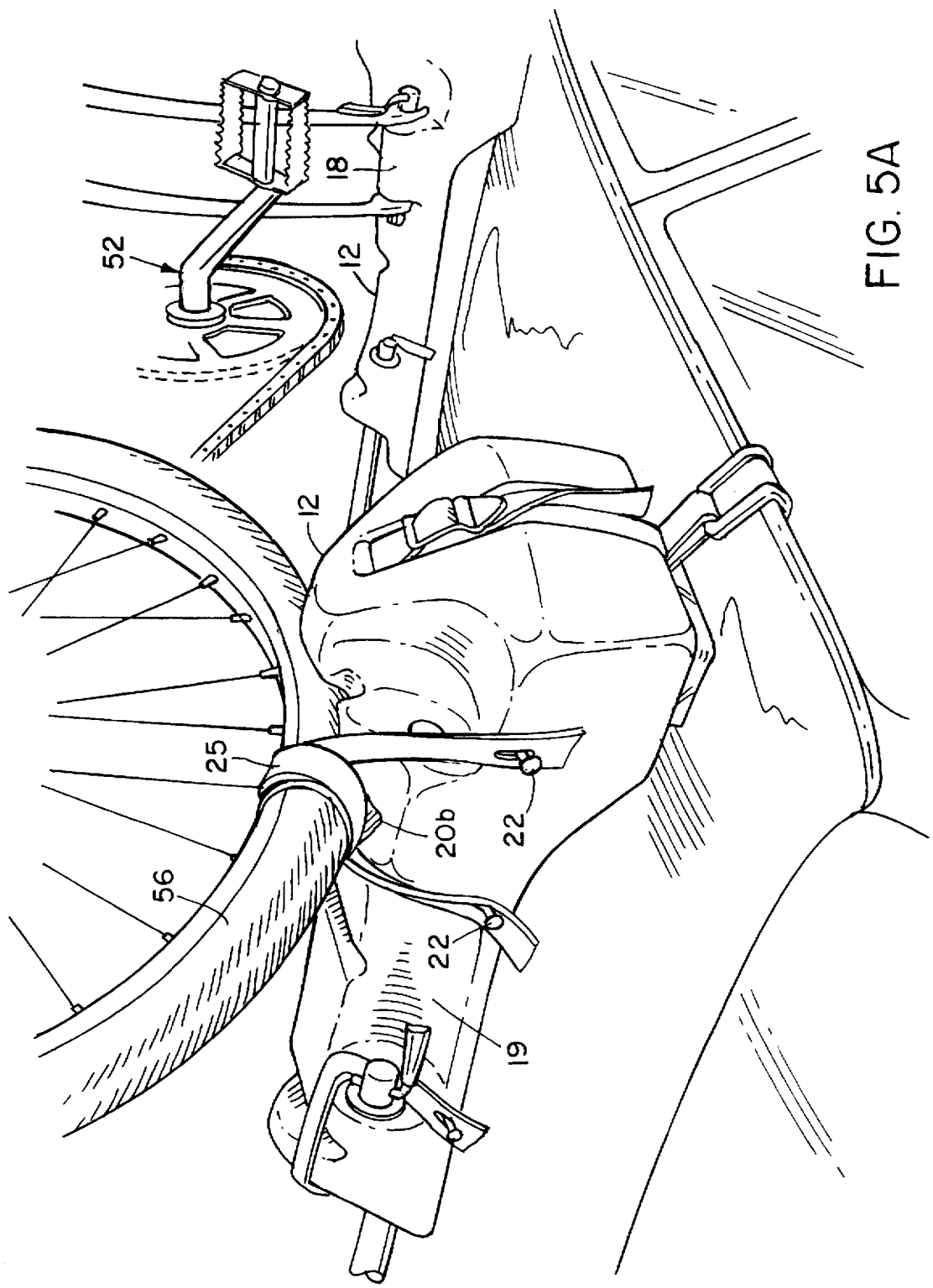

MULTI-SPORT ROOF RACK SYSTEM

RELATED APPLICATION

This application claims priority to U.S. Provisional Application No. 60/013,811, filed Mar. 21, 1996, the content of which is incorporated herein by reference in its entirety.

BACKGROUND OF THE INVENTION

The current state-of-the-art approach for transporting large sports equipment items on automobiles is based on multiple, equipment-specific mounts that are combined with car model-specific rack system components. This approach generally provides good results for individual sports equipment and particular automobiles; however, such systems are high in cost and are typically designed to fit a specific car model.

SUMMARY OF THE INVENTION

A need exists for an economical roof rack system that can accommodate a variety of sports equipment without requiring equipment-specific mounts and can be adapted for use with multiple car models.

The above and other problems are solved by the multi-sport roof rack system of the present invention. The system provides an economical design that is adaptable for reuse on multiple vehicles. Accordingly, a rack system for a motor vehicle comprises a pair of rack members for mounting on a roof of a motor vehicle, disposed in spaced apart relationship and approximately parallel to one another in the transverse direction of the vehicle. Each rack member includes at least one carrying pod. In a preferred embodiment, each rack member comprises a pair of carrying pods slidably joined by a transverse tubular member. The carrying pods each comprise a contact portion along a bottom surface for contacting the roof; a concave portion along a top surface having at least one longitudinal slot formed therein for receiving equipment; a first recessed portion along a rear surface having at least one shoulder formed therein that includes a mounting mechanism for mounting equipment thereto; and a second recessed portion along a lateral surface having an attaching mechanism coupled thereto for attaching the carrying pod to the motor vehicle.

According to an aspect of the invention, the pair of carrying pods of one of the pair of rack members is adjustably aligned with the pair of carrying pods of the other of the pair of rack members such that respective longitudinal slots are aligned with each other.

According to another aspect, the top portion of each carrying pod includes three longitudinal slots in spaced apart relationship and approximately parallel to one another.

According to another aspect, the mounting mechanism comprises a fork mounting mechanism disposed through an opening in the shoulder.

According to yet another aspect, the attaching mechanism comprises a strap connected to a hook for attaching to an edge of the roof. The attaching mechanism can include a ratchet operable with a key lever for tensioning the strap.

In a preferred embodiment, each pair of carrying pods is connected across the car roof by an expander tube that provides adjustment for a range of roof mounting widths. The rack members are fastened to the car by adjustable straps and hooks that grab under the rain gutters, or into the door frames on cars without gutters, or through the interior of the car in cases where no suitable clamping surfaces exist.

In a preferred embodiment, the rack members are mounted independently to the roof, and spaced apart to accommodate the particular equipment load being carried. In another preferred embodiment, the rack members are connected by a pair of longitudinal grooved rails that can be adjusted to various lengths to fit different sports equipment.

Equipment items can be secured onto the carrying pods by straps that attach to molded-in studs, or by long straps that tie around the pods and expander tube. In a preferred embodiment, a bicycle can be mounted to the rack system by fork-mount hardware at one end and straps at the other end of the bicycle.

The roof rack system provides a highly streamlined shape which minimizes wind noise and whistling when in use, and fits the aerodynamic look of many modern automobiles. Further, the equipment mounting and attaching mechanisms of the present invention rack system are generally concealed inside, or recessed into, the carrying pods, where they are protected from the weather, and less likely to cause wind noise.

In a preferred embodiment, the carrying pods are molded of recycled plastic such as #2 high density polyethylene (HDPE). Also, the use of metal in the overall system is minimized to enhance weather resistance, and to aid future recycling.

Installation and use of the roof rack system generally requires no tools, except a specific key lever provided with the system, and can be accomplished in a variety of weather conditions, in many cases by gloved hands. The weight of the system is generally much lighter than comparably functional rack systems offered in the market today.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIG. 1A is a front perspective view of the carrying pods and expander tube of the roof rack system of the present invention as mounted on a motor vehicle.

FIG. 1B is a side view of the carrying pods, front and rear, as mounted on a motor vehicle.

FIG. 3 is a rear perspective view of the rack system illustrating a carrying arrangement in accordance with the present invention.

FIG. 4 is a rear quarter perspective view of the rack system illustrating the fork mounting mechanism, with two different types of clamping hardware.

FIGS. 5A and 5B are quarter perspective views of the rack system showing a bicycle mounted in the fork mounts and the longitudinal slot in accordance with the present invention.

DETAILED DESCRIPTION OF PREFERRED EMBODIMENTS

Figure 2A:
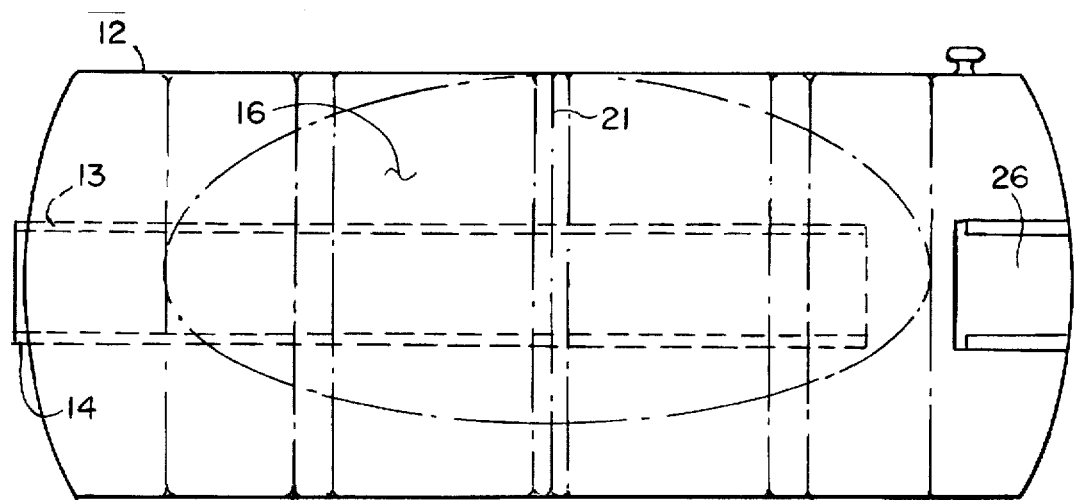
FIGS. 2A–2B are top and rear views, respectively, of one of the carrying pods in accordance with the present invention.
Figure 2B:
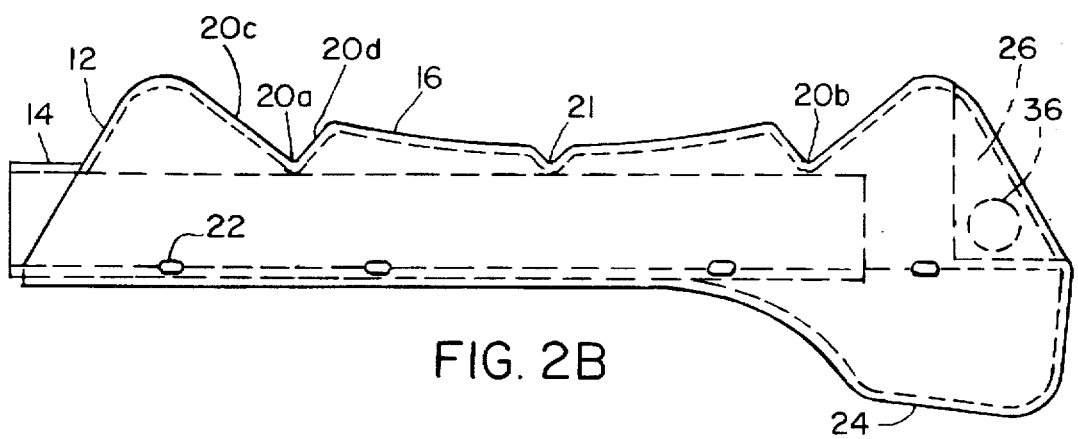
Figure 2C:
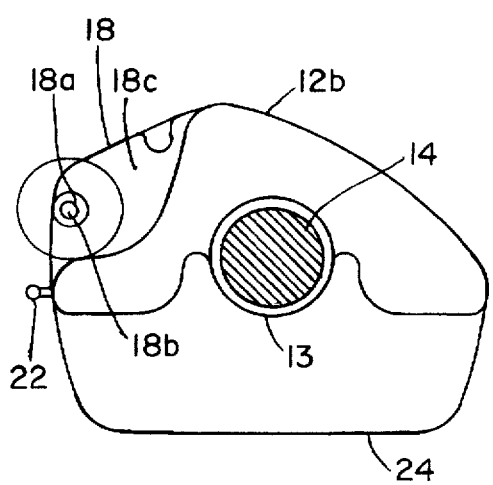
FIGS. 2C–2D are end views (in partial section) taken along lined C—C and D—D, respectively, in FIG. 1A.
Figure 2D:
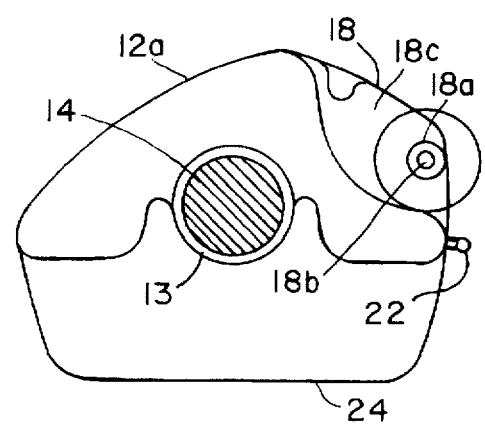

Referring now to the Figures, which show several preferred embodiments, following is a detailed description of the system and its features in design, construction, and use.

A multi-sport roof rack system 10 of the present invention, shown in FIGS. 1A and 1B, comprises a pair of rack members 11a, 11b, each of which includes a pair of carrying pods 12a, 12b, and 12c, 12d, respectively, and an expander tube 14. Each expander tube 14 slidably joins or connects a pair of mirror image pods 12a, 12b and 12c, 12d respectively. The rack members 11a, 11b are attachable to a car roof 50 using an attachment arrangement that includes straps 28 and hooks 32, described further below. The pods 12 each include longitudinal slots 20a, 20b, and 21 for receiving equipment and are also described further below. Each pod 12 has mounting portions molded into its shape along the top and rear surfaces that are designed to accommodate various sports equipment items, discussed further below, all in one molded part. In a preferred embodiment, the carrying pods 12 are molded of recycled plastic such as #2 high density polyethylene (HDPE). The expander tube 14 is made of metal, such as steel or aluminum, but can be made of any other suitable material.

Referring now also to FIGS. 2A–2D, and as noted above, each pair of pods 12a, 12b and 12c, 12d is connected in a transverse direction across the vehicle by expander tube 14 which allows the system 10 to be adjusted to the width of the car roof. Each end of the expander tube 14 is received inside a channel 13 of respective pods 12, thus maintaining the alignment of the pods to one another, and adding reinforcement to the weight bearing surfaces 24 of the pods. In a preferred embodiment, the expander tube 14 is adjustable inwardly or outwardly by sliding it along the channel 13 of the respective pods 12 and locking it with a set screw on each pod. In a preferred embodiment, the expander tube 14 provides adjustment for roof widths in a range from approximately 38 inches to approximately 50 inches.

Each carrying pod 12 has a padded load-bearing portion 24 on its bottom which contacts the car roof 50 (FIG. 1A). The padding reduces scratching of the automobile finish, and provides adequate surface area for mounting the rack system 10 onto a variety of roof shapes and sizes. The padding also adds friction in the interface with the car, thus reducing sliding of the pods 12 when in use with the car in motion.

The carrying pod 12 has a concave, scoop-like portion 16 along the top surface that can function as a cradle or a bar for mounting a surfboard, snowboard, sailboard or kayak. The longitudinal slots 20a, 20b, and 21 are formed in the concave portion. The slots 20a, 20b are each formed by angled surfaces 20c and 20d. The central longitudinal slot 21 serves to register a kayak when the pods 12 are used as a kayak cradle.

Each pod 12 includes an attaching portion 26 (FIGS. 2A and 2B) which houses an adjustable strap 28 for attaching the pod to the car and a hook 32 for hooking under the rain gutter or into the door molding of the car. In applications where the hook 32 does not fit a particular car, an extension strap can be looped through the interior of the car above the doors, and securely attached to the adjustable strap 28. The strap 28 can be tensioned by a hardware device such as a cam lock buckle, a ratchet 36, or an over-the-center latch 34 (FIG. 4). The ratchet 36 is a conventional ratchet mechanism that is operated by a removable ratchet handle or "key lever", which provides some security for keeping the rack on the vehicle without requiring any supplemental locks.

Referring now to FIG. 3, there is shown a typical configuration in which a kayak 60 and a bicycle 52 are mounted on the rack system 10 of the present invention. In an alternative configuration, a canoe can be accommodated by inverting the canoe and positioning it to span across the concave portions 16 of respective pods 12a, 12b and 12c, 12d. Other alternative configurations of common sports equipment include any one of the grouped items in Table 1, any two of the grouped items in Table 2, or the two grouped items listed in Table 3:

| Table 1 (any one item) | Table 2 (any two items) | Table 3 (both items) |
| --- | --- | --- |
| 1 canoe | 1 kayak | 1 canoe |
| 2 kayaks | 2 bicycles | 2 bicycles |
| 4 bicycles | 2 pairs of skis | — |
| 4 pairs of skis | 1 snowboard | — |
| 2 snowboards | 1 surfboard | — |
| 2 surfboards | 1 sailboard | — |
| 1 sailboard & mast | — | — |

The details of mounting equipment onto the rack system 10 of the present invention will now be described. Referring to FIG. 4, a recessed portion 19 of the carrying pod 12 includes a pair of shoulders 18 which project outwardly therefrom. An opening 18b (FIGS. 2C and 2D) through vertical sides 18c of the shoulder 18 receives a mounting mechanism 18a. The mounting mechanism 18a is preferably a standard quick-release fork-mount mechanism for receiving and securing bicycle forks. Other suitable fork mounting mechanisms 18a' (FIG. 4) can also be used.

Figure 5B:
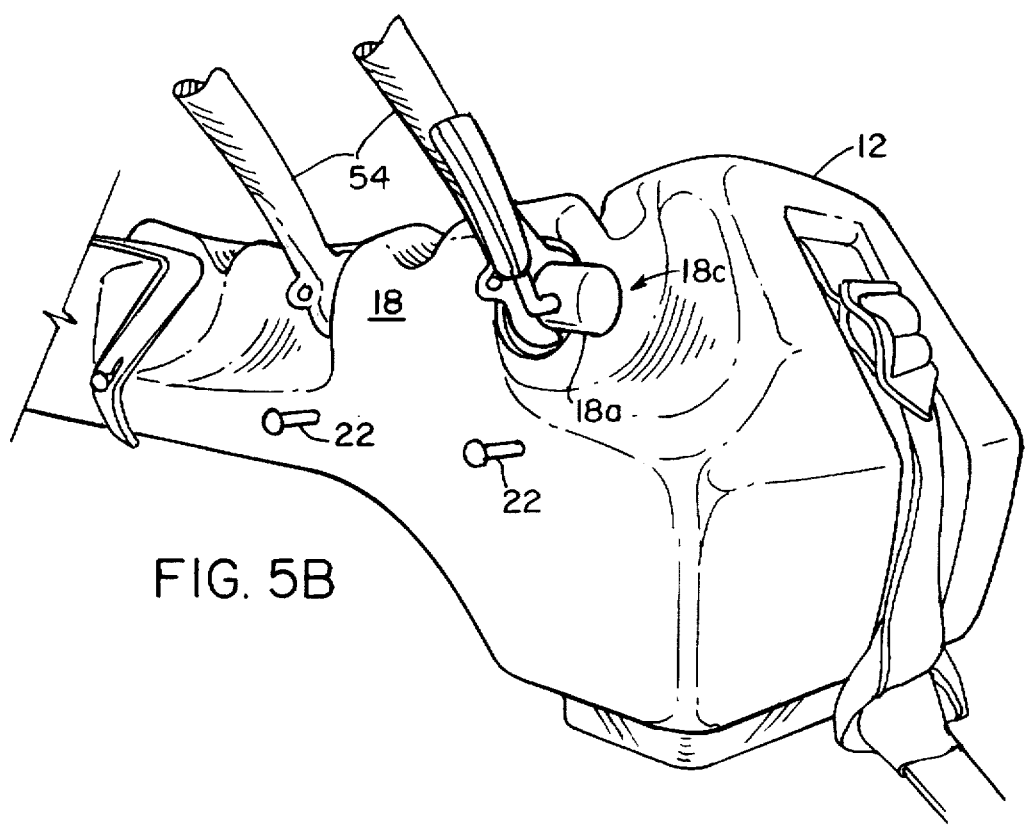
Figure 6A:
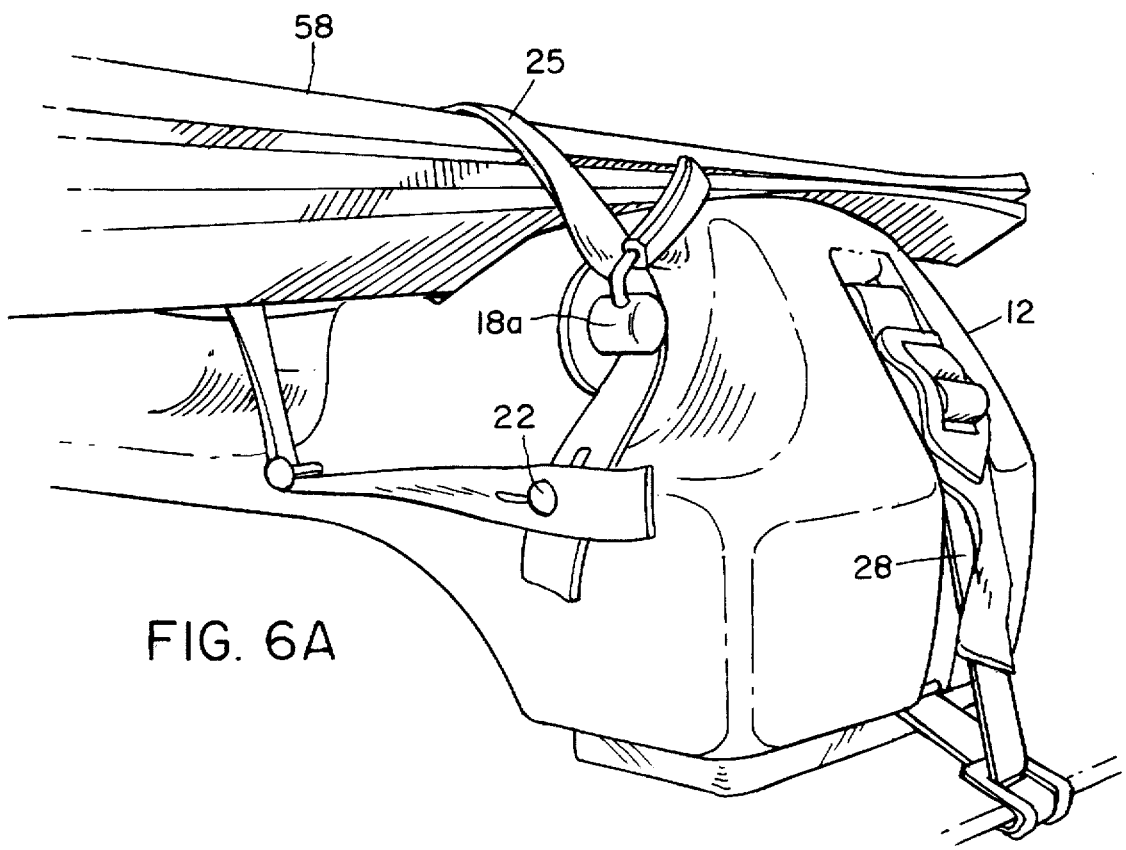
FIGS. 6A and 6B are quarter perspective views of the rack system showing a pair of skis mounted in the longitudinal slots in accordance with the present invention.
Figure 6B:
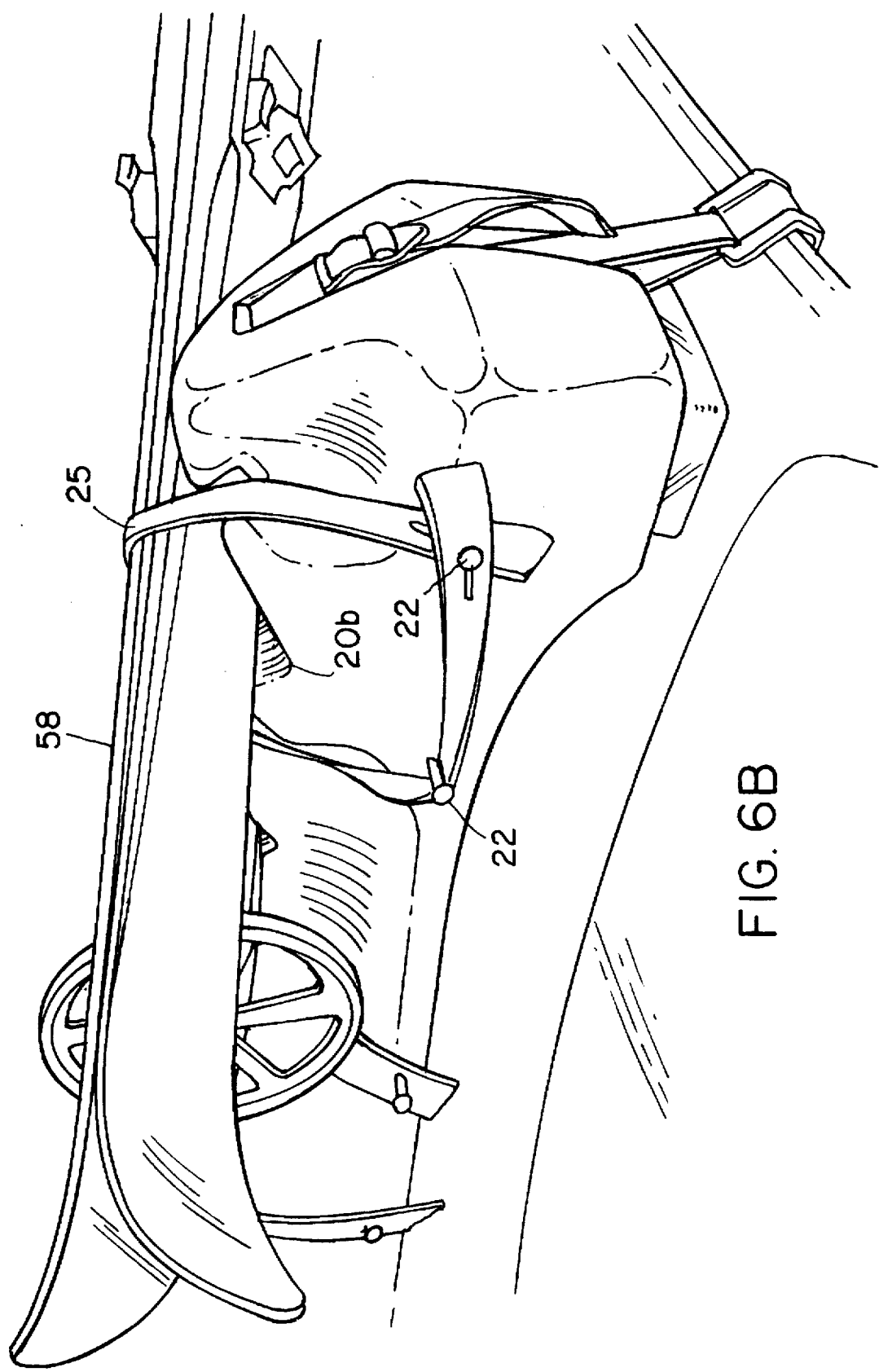

Referring now to FIGS. 5A and 5B, a configuration is shown for mounting bicycle 52 onto the rack system 10 of the present invention. The rear wheel 56 of the bike can be cradled in either of the two longitudinal slots 20a, 20b which are molded into each pod and aligned with the fork mounts 18a. The bicycle forks 54 are received into the fork mounts 18a as shown in FIG. 5B. Referring to FIGS. 6A and 6B, a configuration is shown for mounting skis 58 (or ski poles) onto the rack system 10 of the present invention. The skis 58 can be cradled in either of the longitudinal slots 20a, 20b, which are sized to fit most types and sizes of skis in use today.

In each of the configurations of FIGS. 5A–5B and 6A–6B, two sets of pods, 12a, 12b, 12c, 12d, one fore and one aft, are used to carry the items listed. Tie-down to the pods 12 is accomplished with cam buckle straps or other long straps/ropes 62 (FIG. 3) for most sports items except bicycles and skis. The rear wheel 56 of the bike 52 and both ends of the pair of skis 58 (or poles) are tied down with an elastic strap 25 at each of the longitudinal slots 20a, 20b. A pair of studs 22 projecting horizontally from the shoulder 18 accommodates the elastic strap 25 for securing the equipment items. The straps 25 are attached by hooking the loose end of the strap to the stud or studs 22 after looping it around the item being carried.

Figure 7:
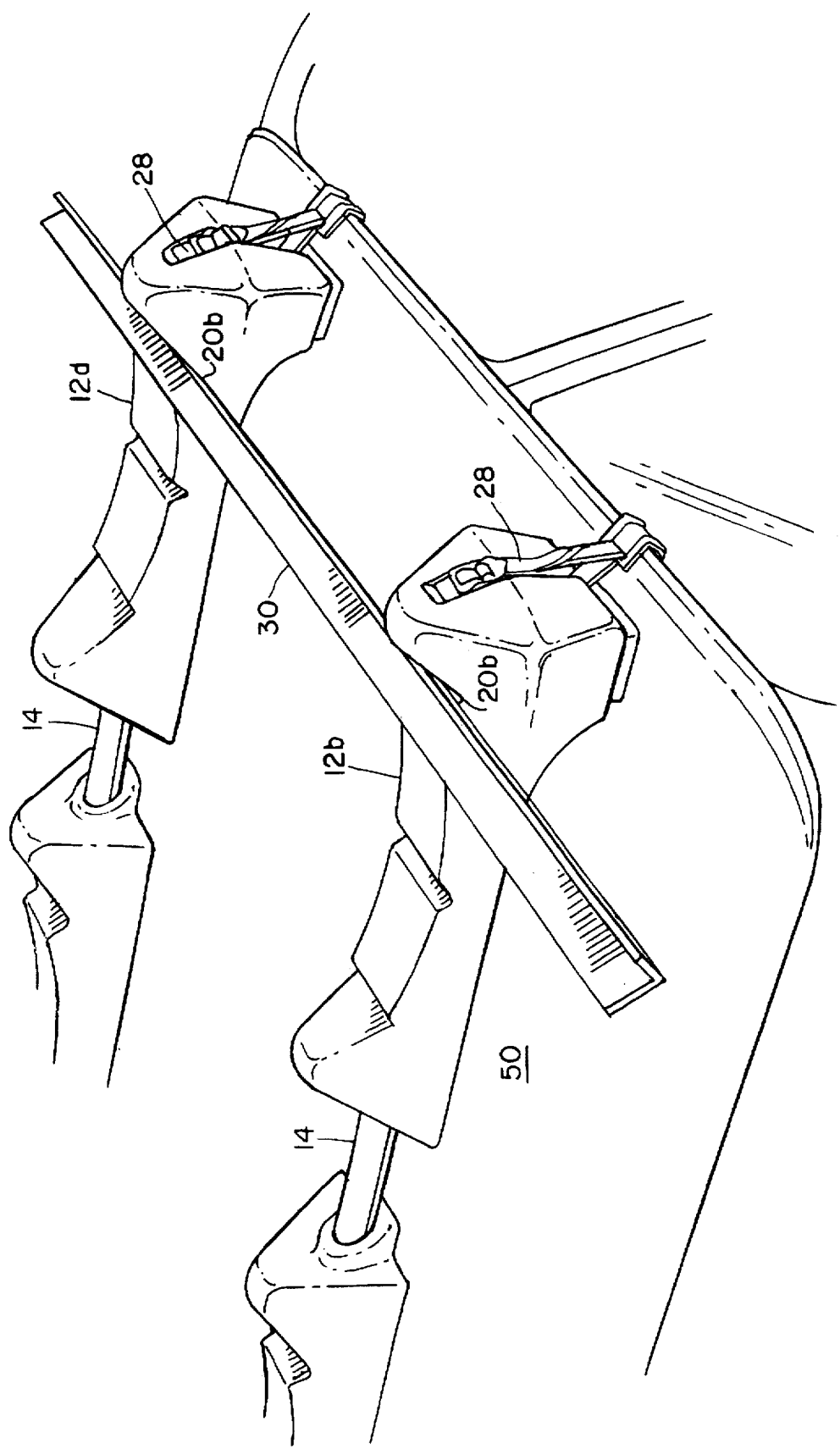
FIG. 7 is a partial perspective view of an alternative embodiment of the present invention showing a rail disposed between the carrying pods.

Referring now to FIG. 7, an alternative embodiment of the present invention includes a grooved rail 30 disposed in longitudinal slots 20b between carrying pods 12b and 12d. The rail 30 can be secured to the pods 12 by looping the elastic straps 25 around the rail and hooking the straps to the studs 22 as described above. For smaller cars which lack sufficient distance longitudinally for the pods to be mounted far enough apart to attach large sports equipment securely, the rail 30 provides an extended mounting surface. For example, the rear wheel 56 of bicycle 52 can be mounted by placing the wheel into the grooved rail 30 at the end disposed in slot 20b of carrying pod 12d and securing the wheel using the elastic strap arrangement described above. The bicycle forks 54 are mounted to the fork mount 18a of carrying pod 12b as described above with respect to FIGS. 5A–5B. The rail 30 also helps to fix the orientation of the pods 12b and 12d to each other.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A rack system for a motor vehicle comprising:
   a pair of rack members for mounting on a roof of a motor vehicle, disposed in spaced apart relationship and approximately parallel to one another in the transverse direction of the vehicle, each rack member including a carrying pod comprising:
   a contact portion along a bottom surface for contacting the roof;
   a top portion having at least one longitudinal slot formed therein for receiving equipment thereon;
   a recessed portion along a rear surface having at least one shoulder projecting therefrom, the at least one shoulder including a fork mounting mechanism for mounting equipment thereto; and
   an attaching mechanism along a lateral surface for attaching the carrying pod to the motor vehicle.

2. The system of claim 1 wherein the carrying pod of one of the pair of rack members is adjustably aligned with the carrying pod of the other of the pair of rack members such that respective longitudinal slots are aligned with each other.

3. The system of claim 2 wherein the top portion of each carrying pod includes three longitudinal slots formed therein in spaced apart relationship and approximately parallel to one another.

4. The system of claim 3 further comprising at least one grooved rail coupled between the pair of rack members for receiving equipment thereon.

5. The system of claim 4 wherein the at least one grooved rail is disposed in respective aligned longitudinal slots.

6. The system of claim 1 wherein the at least one shoulder further includes a pair of spaced apart horizontally projecting studs, each stud for removably attaching opposite ends of an elastic strap thereto for mounting equipment therewith.

7. The system of claim 1 wherein the attaching mechanism comprises an adjustable strap connected to a hook for attaching to the roof.

8. The system of claim 1 wherein the carrying pods are formed of plastic.

9. The system of claim 1 wherein each rack member comprises a pair of carrying pods slidably joined by a transverse tubular member.

10. A rack system for a motor vehicle comprising:
    a pair of rack members for mounting on a roof of a motor vehicle, disposed in spaced apart relationship and approximately parallel to one another in the transverse direction of the vehicle, each rack member including a pair of carrying pods joined by a transverse tubular member, wherein each carrying pod comprises:
    a contact portion along a bottom surface for contacting the roof;
    a top portion having at least one longitudinal slot formed therein for receiving equipment thereon;
    a recessed portion along a rear surface having at least one shoulder projecting therefrom, the at least one shoulder including a fork mounting mechanism for mounting equipment thereto; and
    a recessed portion along a lateral surface having an attaching mechanism coupled thereto for attaching the carrying pod to the motor vehicle.

11. The system of claim 10 wherein the pair of carrying pods of one of the pair of rack members is adjustably aligned with the pair of carrying pods of the other of the pair of rack members such that respective longitudinal slots are aligned with each other.

12. The system of claim 11 wherein the top portion of each carrying pod includes three longitudinal slots formed therein in spaced apart relationship and approximately parallel to one another.

13. The system of claim 12 further comprising at least one grooved rail coupled between the pair of rack members for receiving equipment thereon.

14. The system of claim 13 wherein the at least one grooved rail is disposed in respective aligned longitudinal slots.

15. The system of claim 10 wherein the at least one shoulder further includes a pair of spaced apart horizontally projecting studs, each stud for removably attaching opposite ends of an elastic strap thereto for mounting equipment therewith.

16. The system of claim 10 wherein the attaching mechanism comprises an adjustable strap connected to a hook for attaching to the roof.

17. The system of claim 10 wherein the carrying pods are formed of plastic.

18. A rack system for a motor vehicle comprising:
    a pair of rack members for mounting on a roof of a motor vehicle, disposed in spaced apart relationship and approximately parallel to one another in the transverse direction of the vehicle, each rack member including a pair of carrying pods slidably joined by a transverse expander tube, wherein each carrying pod comprises:
    a contact portion along a bottom surface for contacting the roof;
    a concave portion along a top surface having at least one longitudinal slot formed therein for receiving equipment thereon; and
    a lateral recessed portion having an attaching mechanism coupled thereto for attaching the carrying pod to the motor vehicle.

19. The system of claim 18 wherein the pair of carrying pods of one of the pair of rack members is adjustably aligned with the pair of carrying pods of the other of the pair of rack members such that respective longitudinal slots are aligned with each other.

20. The system of claim 19 wherein the concave portion of each carrying pod includes three longitudinal slots formed therein in spaced apart relationship and approximately parallel to one another.

21. The system of claim 20 further comprising at least one grooved rail coupled between the pair of rack members for receiving equipment thereon.

22. The system of claim 21 wherein the at least one grooved rail is disposed in respective aligned longitudinal slots.

23. The system of claim 18 further comprising a recessed portion along a rear surface having at least one shoulder projecting therefrom, the at least one shoulder including a mounting mechanism for mounting equipment thereto.

24. The system of claim 23 wherein the at least one shoulder includes an opening and wherein the mounting mechanism comprises a fork mounting mechanism disposed through the shoulder opening.

25. The system of claim 24 wherein the at least one shoulder further includes a pair of spaced apart horizontally projecting studs, each stud for removably attaching opposite ends of an elastic strap thereto for mounting equipment therewith.

26. The system of claim 18 wherein the attaching mechanism comprises an adjustable strap connected to a hook for attaching to an edge of the roof and a ratchet operable with a key lever for tensioning the adjustable strap.

27. The system of claim 18 wherein the carrying pods are formed of plastic.

28. A rack system for a motor vehicle comprising:
 a pair of rack members for mounting on a roof of a motor vehicle, disposed in spaced apart relationship and approximately parallel to one another in the transverse direction of the vehicle, each rack member including a carrying pod comprising:
  a contact portion along a bottom surface for contacting the roof;
  a top concave portion having at least one longitudinal slot formed therein for receiving equipment thereon;
  a recessed portion along a rear surface having at least one shoulder projecting therefrom, the at least one shoulder including a mounting mechanism for mounting equipment thereto; and
  an attaching mechanism along a lateral surface for attaching the carrying pod to the motor vehicle.

29. A rack system for a motor vehicle comprising:
 a pair of rack members for mounting on a roof of a motor vehicle, disposed in spaced apart relationship and approximately parallel to one another in the transverse direction of the vehicle, each rack member including a pair of carrying pods joined by a transverse tubular member, wherein each carrying pod comprises:
  a contact portion along a bottom surface for contacting the roof;
  a top concave portion having at least one longitudinal slot formed therein for receiving equipment thereon;
  a first recessed portion along a rear surface having at least one shoulder projecting therefrom, the at least one shoulder including a mounting mechanism for mounting equipment thereto; and
  a second recessed portion along a lateral surface having an attaching mechanism coupled thereto for attaching the carrying pod to the motor vehicle.

30. A rack system for a motor vehicle comprising:
 a pair of rack members for mounting on a roof of a motor vehicle, disposed in spaced apart relationship and approximately parallel to one another in the transverse direction of the vehicle, each rack member including a pair of carrying pods joined by a transverse tubular member, wherein each carrying pod comprises:
  a contact portion along a bottom surface for contacting the roof;
  a top surface having a longitudinal slot formed therein for receiving equipment thereon; and
  a recessed portion along a surface having a shoulder projecting therefrom, the shoulder having a fork mounting mechanism for mounting bicycle forks thereon.

31. The system of claim 30 wherein the fork mounting mechanism is aligned with the longitudinal slot and the longitudinal slot is adapted to receive ski equipment or a bicycle wheel.

32. The system of claim 30 wherein the carrying pods are formed of plastic.

* * * * *

UNITED STATES PATENT AND TRADEMARK OFFICE
CERTIFICATE OF CORRECTION

PATENT NO. : 5,738,258
DATED : April 14, 1998
INVENTOR(S) : Paul H. Farrow and Dale W. Vetter It is certified that error appears in the above-identified patent and that said Letters Patent is hereby corrected as shown below:

Column 5, line 64 delete "a recessed" and insert ---a first recessed---.

Column 6, line 1 delete "a recessed" and insert ---a second recessed---.

Signed and Sealed this

Sixteenth Day of February, 1999

Attest:

*Acting Commissioner of Patents and Trademarks*

*Attesting Officer*